March 26, 1940.   C. PAURO   2,194,671
WINDSHIELD WIPER
Filed Sept. 14, 1937
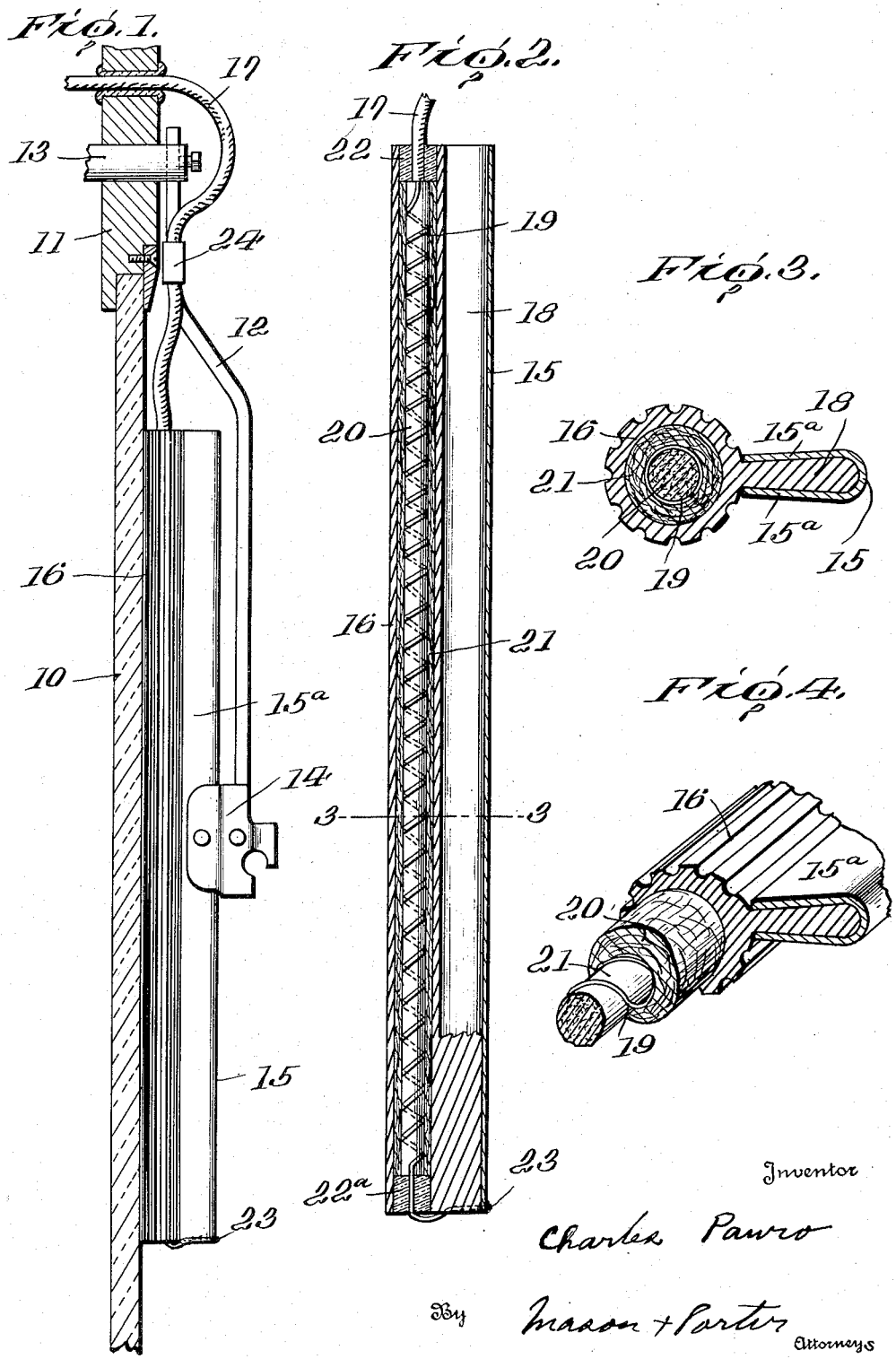
Inventor
Charles Pauro
By Mason + Porter
Attorneys Patented Mar. 26, 1940

2,194,671

UNITED STATES PATENT OFFICE 2,194,671

WINDSHIELD WIPER

Charles Pauro, Camden, N. J.

Application September 14, 1937, Serial No. 163,836

1 Claim. (Cl. 15—250)

The present invention relates to new and useful improvements in a wiper for use on the windshields of vehicles, such as, automobiles, trains, boats, airplanes and the like, and more particularly to improvements in a windshield wiper which is electrically heated so as to prevent the accumulation of snow or ice on the windshield.

An object of the invention is to provide a windshield wiper wherein a flexible wiping element is electrically heated so as to prevent accumulation of ice or snow on the windshield.

A further object of the invention is to provide a windshield wiper wherein a flexible tubular wiping element is employed and wherein the electric heating element is housed within the tubular wiping element in such a manner that the wiping element retains its flexibility.

A still further object of the invention is to provide a windshield wiper of the above type which is of a simple and inexpensive construction, which is efficient in operation, and which requires a minimum number of parts.

The above and other objects of the invention will in part be obvious and will be hereinafter more fully pointed out.

In the accompanying drawing:

Figure 1 is a side view showing the windshield wiper in position with respect to a windshield.

Figure 2 is an enlarged side view, partly in section, showing the windshield wiper.

Figure 3 is a further enlarged sectional view, taken along the line 3—3 of Figure 2.

Figure 4 is a sectional perspective view showing the various parts of the improved windshield wiper.

It is of course necessary, when driving vehicles of various types, that clear vision be maintained through the windshield, and in particular, it is necessary under certain conditions to prevent the accumulation of snow, ice or sleet on the windshield. The present invention relates generally to a windshield wiper which will prevent the accumulation of snow or the like on the windshield of the vehicle.

Referring more in detail to the accompanying drawing, there is shown, in Figure 1, a vehicle windshield 10 mounted in a frame 11. The wiper actuating arm 12 is connected to an oscillating shaft 13 extending through the frame 11. The opposite end of the actuating arm 12 is connected to a metal clip 14 which is secured to a U-shaped metal holder 15. A tubular wiping element 16, preferably of rubber or the like, is secured to the holder 15. An electric wire 17 is connected to a heating element disposed within the wiping element 16. The wire 17 extends through the frame 11 and may be connected to any suitable switch (not shown).

Referring more in detail to Figures 2, 3 and 4, the tubular portion 16 of the wiping element is provided with a flange portion 18 which is firmly held between the leg portions 15a of the metal holder 15. The external surface of the tubular portion 16 may be knurled to provide an effective wiping surface. A heating wire 19 is wound around a fibrous core or wick 20 which is flexible so as to permit the required amount of yielding or flexing of the wiper element. The heating element and fibrous core are disposed within the tubular portion 16 of the wiping element and an asbestos covering 21 is wrapped around the heating element and the fibrous core. The asbestos covering thus prevents burning of the wiping element but permits the transmission of heat from the heating element therethrough to the wiping element.

The asbestos covering 21 and the fibrous core 20 terminate short of the ends of the tubular wiping element 16. The ends of the wiping element are closed by plugs 22, 22a preferably of rubber. The wire 17 extends through the plug 22 and is connected to the heating wire 19. The opposite end of the heating wire 19 extends through the plug 22a and is soldered or otherwise secured, as at 23, to the metal holder 15. Thus the heating wire 19 is grounded through the metal holder 15.

The wire 17 is connected by a clip 24 to the actuating arm 12 so that they will oscillate in unison. When there is danger of snow or ice forming on the windshield, the switch (not shown) is turned on to permit current to flow from the wire 17 through the heating element 19. Heat will be transmitted from the heating element through the asbestos covering 21 to the tubular heating element 16 so that snow or ice forming on the windshield will be melted as the wiper travels over the surface thereof. From the foregoing description, it will be seen that the entire wiping element is itself heated so as to prevent the formation of snow or ice on the windshield. The fibrous core 20 and the asbestos covering 21 are flexible so that the inherent resiliency of the rubber wiping element 16 is not affected. Thus, a tubular wiping element may be easily and conveniently equipped with the heating element of the present invention.

A specific form of the invention has been described in connection with the form shown on the accompanying drawing, but it is to be clearly understood that various changes in the detail of construction and arrangement of parts may be made without departing from the scope of the invention as set forth in the appended claim.

I claim:

A windshield wiper comprising a holder adapted to be connected to a wiping arm, a wiping element secured to said holder and including an unconfined flexible tubular wiping portion, a flexible fibrous core member disposed substantially centrally within said tubular wiping portion, an electric heating wire wound around said core member and a flexible asbestos covering disposed within said tubular wiping portion and surrounding said heating wire, the flexible nature of said covering and of said core member cooperating to permit the tubular portion of the wiping element to retain its flexibility.

CHARLES PAURO.